Figure 2:
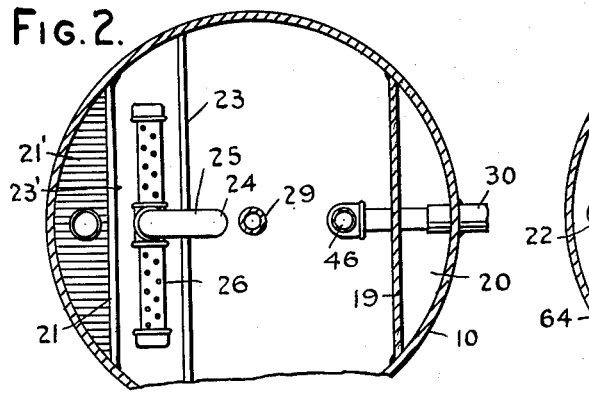

Oct. 31, 1950   A. V. B. CANDLER ET AL   2,528,032
METHOD OF AND APPARATUS FOR TREATING
PETROLEUM EMULSIONS
Filed Aug. 6, 1947   3 Sheets-Sheet 1
Fig. 1.
Fig. 13.
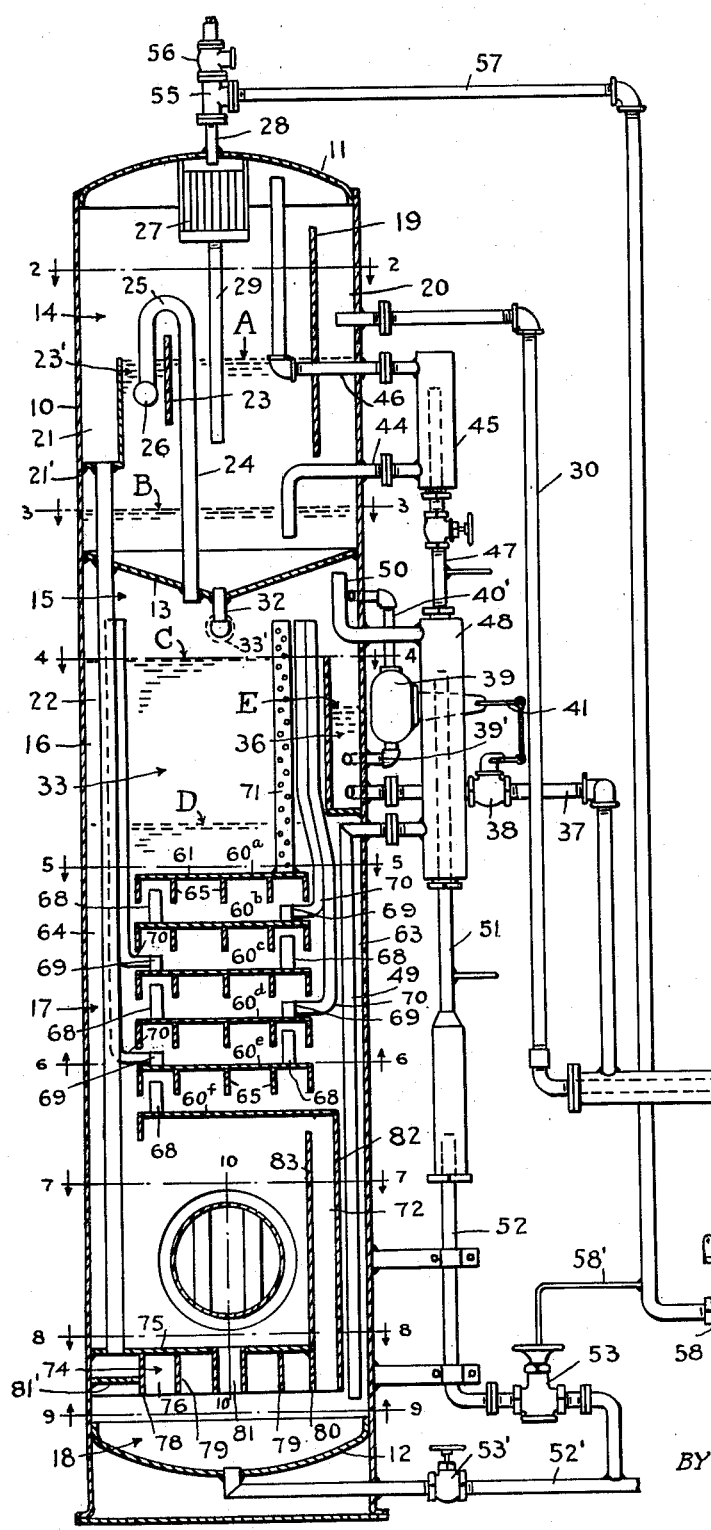
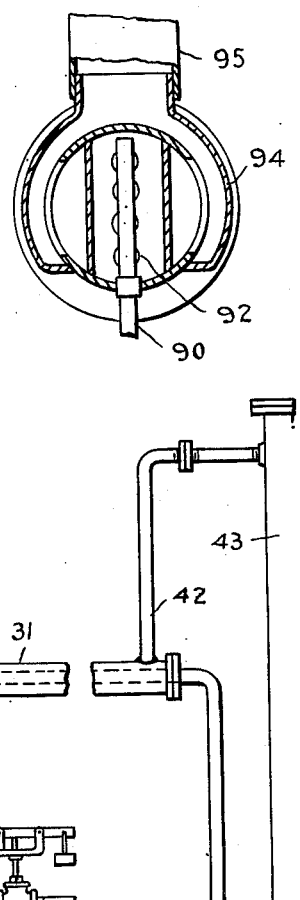
INVENTORS.
A.V. B. CANDLER
W. A. STOVER
BY
ATTORNEYS Oct. 31, 1950

A. V. B. CANDLER ET AL 2,528,032

METHOD OF AND APPARATUS FOR TREATING
PETROLEUM EMULSIONS

Filed Aug. 6, 1947

3 Sheets-Sheet 2

INVENTORS.
A. V. B. CANDLER
W. A. STOVER
BY
ATTORNEYS

Oct. 31, 1950     A. V. B. CANDLER ET AL     2,528,032
METHOD OF AND APPARATUS FOR TREATING
PETROLEUM EMULSIONS
Filed Aug. 6, 1947     3 Sheets-Sheet 3
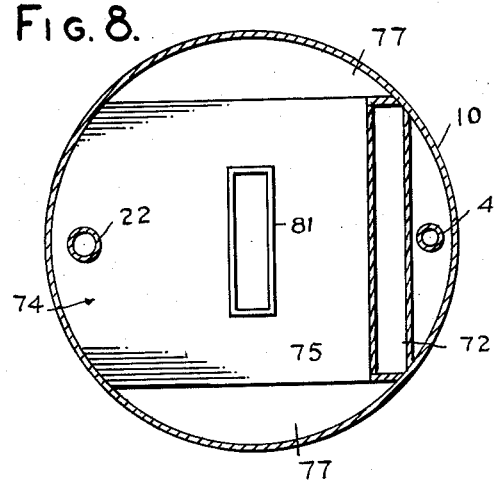
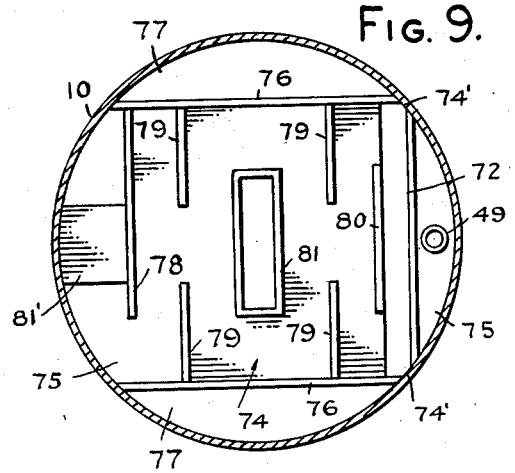
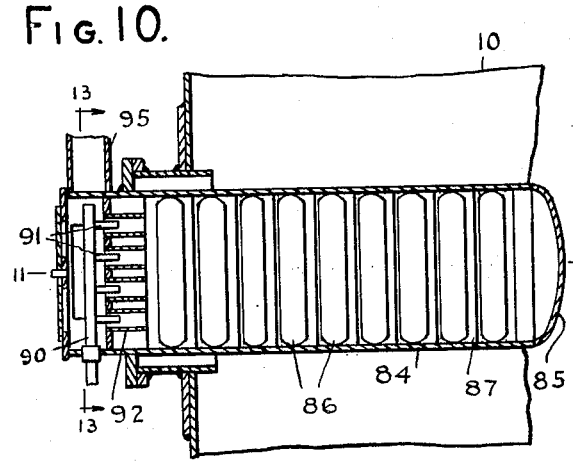
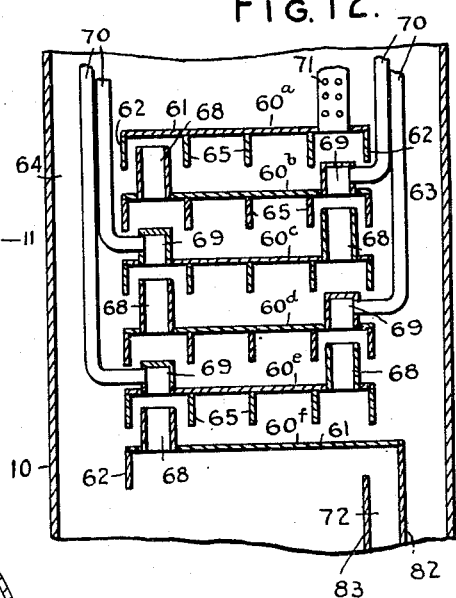
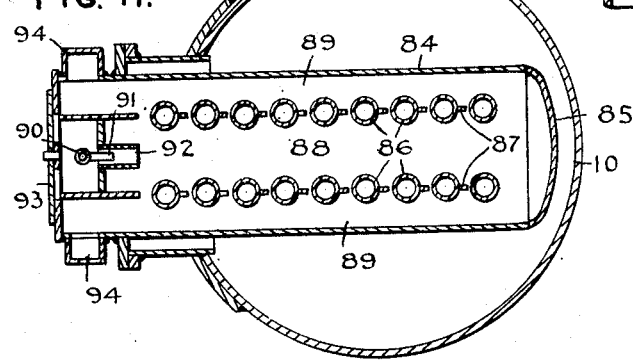
Inventors
A.V.B. CANDLER
W.A. STOVER
By
Attorney Patented Oct. 31, 1950

2,528,032

UNITED STATES PATENT OFFICE 2,528,032

METHOD OF AND APPARATUS FOR TREATING PETROLEUM EMULSIONS

Arthur V. B. Candler and William A. Stover, Tulsa, Okla.

Application August 6, 1947, Serial No. 766,498

13 Claims. (Cl. 183—2.7)

This invention relates to a method of and apparatus for treating petroleum emulsions, for separating out the water and gas in the mixture.

An important object of the invention is to provide apparatus of the above mentioned character which is continuous and automatic in operation and highly efficient.

A further object of the invention is to provide means for separating out the free water and free gas associated with the emulsion, prior to the resolution of the emulsion by the application of heat and washing.

A further object of the invention is to effect economical dehydration by utilizing the factors of heat and scrubbing by contact with wetted surfaces, in order to break the emulsion and promote coalescence of the oil and water particles, resulting in the separation of the oil constituents and sedimentation of the heavier salt water droplets.

A further object of the invention is to provide means to vent the gases from the individual scrubbing or washing trays and to conduct the same to the exterior of the oil stratum while preventing such gases from contacting with the oil thereby eliminating excessive agitation of the oil.

A further object of the invention is to provide means for eliminating undue fluctuation in the flow rate of the fluid in its travel upwardly through the treating and settling sections, thereby maintaining the proper spreading action of the emulsion or oil film under the trays.

A further object of the invention is to provide means for collecting any gaseous products escaping from the clean oil within the settling chamber due to vaporization, and collecting the gaseous products from the scrubbing or washing trays, and combining such gaseous products.

A further object of the invention is to provide means for recovering the heavier fractions of the gaseous fluids accumulated in the vapor section of the settling chamber, by condensation and by absorption in the relatively cool incoming emulsion.

A further object of the invention is to provide for the treatment of the gaseous products after the condensation and absorption method, by means of a mist extractor, for further recovery of the heavier hydrocarbon fractions remaining in the gaseous fluids, and the return of the recovered fractions to the emulsion.

Other objects of the invention will be apparent during the course of the following description.

Figure 5:
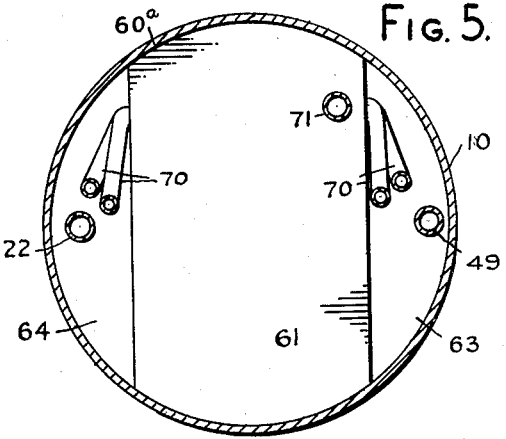
Figure 3:
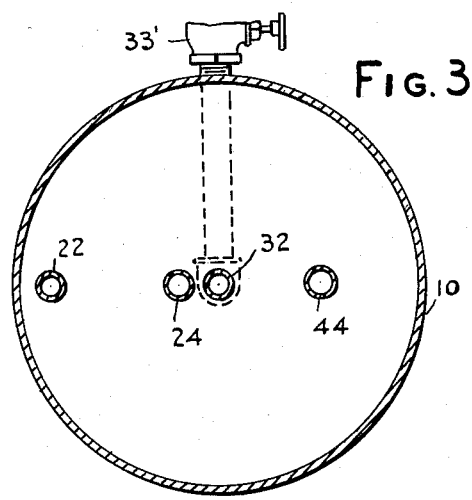
Figure 6:
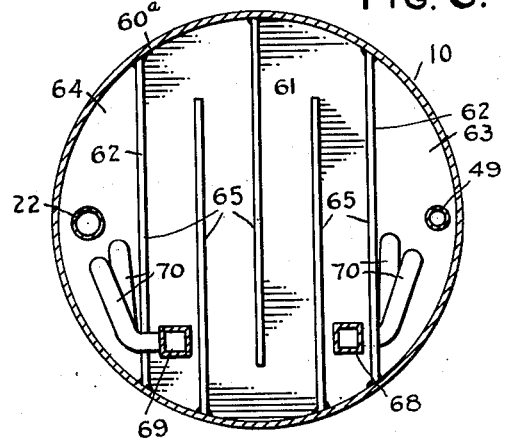
Figure 4:
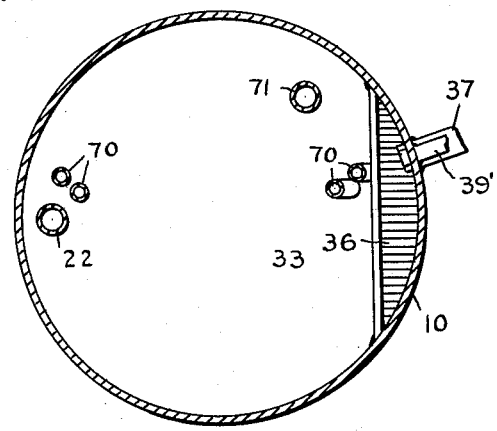
Figure 7:
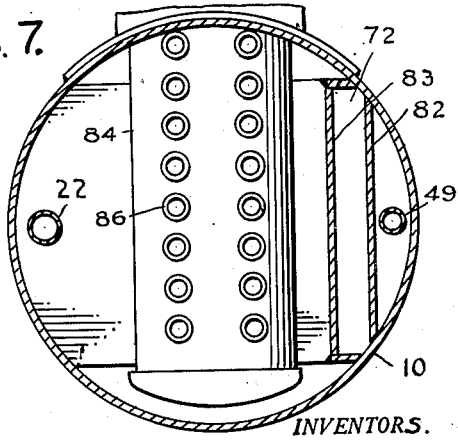

In the accompanying drawings forming a part of this application and in which like numerals are employed to designate like parts throughout the same, Figure 1 is a central vertical longitudinal section through apparatus embodying our invention, parts in elevation, Figure 2 is a horizontal section taken on line 2—2 of Figure 1, Figure 3 is a similar view taken on line 3—3 of Figure 1, Figure 4 is a similar view taken on line 4—4 of Figure 1, Figure 5 is a similar view taken on line 5—5 of Figure 1, Figure 6 is a horizontal transverse section taken on line 6—6 of Figure 1, looking up, Figure 7 is a horizontal section taken on line 7—7 of Figure 1, looking down, Figure 8 is a similar view taken on line 8—8 of Figure 1, looking down, Figure 9 is a similar view taken on line 9—9 of Figure 1, looking up, Figure 10 is a vertical section through the heater, taken on line 10—10 of Figure 1, Figure 11 is a horizontal section taken on line 11—11 of Figure 10, Figure 12 is a central vertical section through the scrubbing and washing trays, similar to Figure 1, but upon an enlarged scale, Figure 13 is a vertical transverse section taken on line 13—13 of Figure 10.

In the drawings, wherein for the purpose of illustration is shown a preferred embodiment of our invention, the numeral 10 designates a vertical preferably cylindrical casing or tank having upper and lower heads 11 and 12. Arranged within the casing 10 is an inner head 13, forming a liquid tight joint therewith, and this head 13 tapers downwardly, as shown. The head 13 divides the casing 10 into separate sections or compartments 14 and 15. The compartment or section 14 serves as a combined knockout and gas separating chamber. The section or compartment 15 provides an oil settling chamber 16, a scrubbing or washing chamber 17, and a drain chamber 18, arranged at different elevations and having communication with each other, as shown.

Arranged within the vertical compartment 14 is a vertical plate or baffle 19, Figures 1 and 2. The baffle 19 extends to opposite side portions of the casing 10 and is secured thereto to form a liquid tight joint. The baffle is spaced from the heads 11 and 13, as shown. The baffle 19 forms with the casing 10 a vertical passage 20, and this passage is open at its top and bottom. Arranged opposite the vertical baffle 19 and adjacent to the side portion of the casing 10 is an overflow weir-box 21, open at its top and having a bottom 21'. The top of the weir-box is arranged near the longitudinal center of the compartment 14, and determines the level A of the emulsion. A vertical down or takeoff pipe 22 leads into the bottom 21' of the weir-box and passes through the head 13, and terminates near the drain chamber 18, as shown. Also arranged within the compartment 14 is a vertical plate or baffle 23, Figures 1 and 2, which extends to opposite side portions of the tank 10 and is secured thereto for forming a liquid tight joint. This vertical baffle 23 is spaced from the heads 11 and 13, and terminates below the top of the baffle 19 and above the bottom of this baffle. The baffle 23 is arranged near and spaced from the weir-box 21, affording a vertical passage 23'. A vertical baffle 23 extends above and below the level A of the emulsion within the compartment 14. A vertical pipe 24, Figures 1 and 2, is arranged within the compartment 14 between the baffles 19 and 23 and extends through and below the head 13, as shown. At its upper end, this vertical pipe 24 has a downwardly bent U-shaped portion 25, which straddles the top of the baffle 23 and has its lower end arranged below the emulsion level A. The U-shaped extension 25 carries at its submerged end a horizontal perforated pipe 26. Attention is called to the fact that the perforated pipe 26 is arranged within the vertical contracted passage 23' between the vertical baffle 23 and the side wall of the weir-box 21, and that the emulsion passes beneath the lower end of the baffle 23 and travels about the perforated pipe 26, in close relation to the perforated pipe 26, prior to its discharge into the open ends of the weir-box.

The arrangement is such that all of the emulsion held within the chamber 14 travels through the elongated contracted passage 23' before it enters the weir-box 21 and is therefore brought into intimate direct contact with the heavier hydrocarbon fractions discharging from the perforated pipe 26 so that the maximum absorption of the heavier hydrocarbon fractions is effected by the emulsion, which absorption is aided by condensation of the heavier fractions in the pipe 24. The heavier fractions are cooled by heat exchange with the emulsion through the medium of the submerged pipe 24 and through the medium of the partition plate 13. However, the more effective heat transfer is accomplished by means of the direct contact of the heavier hydrocarbon fractions in the chamber 14 with the emulsion within this chamber. This direct contact effects both absorption and condensation of the heavier hydrocarbons within the chamber 14. The heavier components of the gaseous mixture arising from the hot oil in chamber 33 are cooled upon contact with the plate 13 and the inner surface of the pipe 24, which serve as a cold plate or surface condenser. There will be recycling of the vapors liberated from the hot oil in the chamber 33 when condensation takes place on the cold plate or surface condenser, resulting in the condensate from the heavy vapors, to drop back into the hot oil in the chamber 33 and again being vaporized. This process is continuous and serves to separate or fractionate out the lighter vapors, without losing the heavy condensed ends. The lighter components of the gaseous mixture which are fractionated out and not held in solution in the hot oil in chamber 33 after recycling, remain in the vapor-phase and pass upwardly through the pipe 24. The direct contact caused by bubbling the vapors through the emulsion in the chamber 14 by means of the submerged perforated pipe 26 will cause the temperatures of such vapors to more nearly approach the temperature of the emulsion in the chamber 14, than can be effected by the use of the cold plate or surface condenser. The direct contact of the vapors with the emulsion in the chamber 14 is supplemental to the condensation by means of the cold plate or surface condenser and this direct contact causes absorption or condensation of the components in the gaseous mixture at a lower temperature with respect to the emulsion within the chamber 33. This direct contact process at the lower temperature recovers additional condensate, not condensible by means of the cold plate or surface condenser. The combination of the cold plate or surface condenser which primarily condenses out the heavier components in the gaseous mixture arising from the hot oil in the chamber 33, and the supplemental direct contact process between the vapors and the emulsion in the chamber 14, effects recovery of the desirable fractions within the working temperature and pressure.

Arranged in the top of the compartment 14 is a mist extractor 27 of any well known or preferred type, connected at its gas discharge side with a pipe 28 and having a liquid condensate return pipe 29 connected therewith. This mist extractor may be of the type shown in Patent 2,157,305. The pipe 29 is vertical and is arranged centrally within the compartment 14 and projects below the emulsion level A but terminates above the water level B. The numeral 30 designates the emulsion inlet pipe, which passes through a casing 31 of a heat exchanger and the emulsion is preheated by the outgoing pure oil, as will be explained. The pipe 30 receives the emulsion from a suitable source and this pipe discharges into the upper portion of the compartment 14 behind the vertical baffle 19 and at a point near the vertical center of the baffle. This pipe therefore discharges into the vertical passage 20 and the emulsion passes beneath the lower end of the baffle 19, as is obvious. When the emulsion is discharged into the vertical passage 20 it impinges against the baffle 19 and the free water and free gas are separated out, the free gas passing upwardly over the top of the baffle and the free water and emulsion passing about the lower end of the baffle 19, the water accummulating in the bottom of the compartment adjacent to the head 13. A drain pipe 32 is connected with the head 13 and this pipe is equipped with a manually operated valve 33'. The pipe 32 extends through the side of the casing 10, Figure 3, as is obvious. Automatic means are provided to withdraw the water for maintaining the water level B constant, as will be explained, and this means is separate from the drainpipe 32.

The lower compartment 15 which is separate from compartment 14 has an upper settling chamber 33, having an oil level C and a water level D. The settling chamber has its top and bottom open. The settling chamber 33 has a vertical weir-box 36, open at its top to receive the pure oil, and to define the level C. Leading into this weir-box 36 is an oil outlet pipe 37, Figures 1 and 4, equipped with a valve 38 for controlling the passage of oil through the same. The numeral 39 designates an oil level control device for defining the oil level E of the weir-box. The device 39 is of the usual construction and embodies a casing having communication with the weir-box by a pipe 39', and a pipe 40' is connected with this device and leads into the top of the compartment 15. The device 39 is float controlled and includes a vertically swinging lever 41, connected with the valve 38, to open and close the same. When the oil within the weir-box 36 rises above the level E, the valve 38 is automatically opened and the heated pure oil discharges through the pipe 37 into the casing 31 of the heat exchanger, preheating the incoming emulsion passing through the pipe 30. The heated oil from the heat exchanger discharges through the pipe 42 into a tank 43.

The water is automatically withdrawn responsive to the differential in hydrostatic pressure between the combined head of water and oil in compartment 14 and the waterhead in syphon disposal pipe 45, the water being withdrawn from the bottom of compartment 14 by a pipe 44, leading into the vertical box 45 of the syphon structure. This box has a pressure equalizing pipe 46, leading to the top of the compartment 14. The syphon including the box 45 receives a vertically adjustable pipe or nipple 47, also slidable in the box 48 of a second syphon of any wellknown or preferred type. This syphon which operates on the same principle as the upper syphon establishes the respective water levels D and B, has an intake pipe 49 which leads to drain compartment 18. The syphon box 48 is also connected with a pressure equalizing pipe 50 which leads to the top of the settling chamber 33. The syphon box 48 has a vertically adjustable pipe or nipple 51, slidably engaging a water outlet pipe 52. Connected in the pipe 52 is an automatic pressure control valve 53, which may be of either spring or weight type and is operated solely by the head of water in the pipe 52, independently of any change of pressure in the system. The pipe 52 is connected with a main water outlet pipe 52', connected with the head 18, and equipped with a manual cutoff valve 53'.

The pipe 28 has a coupling 55 connected therein, and this pipe is also equipped with a pressure relief valve 56. The coupling 55 is connected with a gas outlet pipe 57, equipped with a conventional back pressure regulator 58, which permits of the discharge of the gas but keeps the pressure in the pipe 57 at the operating pressure thereby controlling the pressure carried by the entire system. A small gas equalizing pipe 58' connects the pipe 57 with the diaphragm of the valve 53, thereby carrying the system pressure on the top of the diaphragm of the valve 53, so that the diaphragm is actuated solely by the head of water in the pipe 52, which water head engages the lower face of the diaphragm. The relief valve 56 is set to open at a few pounds above the operating pressure and is a safety measure.

Arranged within the upper portion of the scrubbing and treating chamber 17, Figures 1, 12, and 6, and below the water level D, is a series of vertically spaced horizontal scrubbing or washing trays 60a, 60b, 60c, 60d, 60e, and 60f, disposed in superposed relation. Each tray 60a to 60e inclusive, includes a horizontal top 61, Figures 1, 5, and 6, which extends from one side portion of the casing 10 to the opposite side portion and is secured thereto to form a liquid tight joint. The top 61 has its opposite edge portions bent downwardly to form a skirt or flange 62, which are straight, and provide vertical passages 63 and 64, with the casing 10. The skirts or flanges 62 extend to the side portions of the casing 10 and have a liquid tight connection therewith. The lower ends or bottoms of the trays are open, as shown. Each tray 60a to 60e is provided beneath its top 61 with baffles 65, arranged in staggered relation, and spaced from each other and the outer baffles 65 are spaced from the skirts 62. The outer ends of the baffles 65 extend to the casing 10 and are secured thereto and these baffles may also be secured to the top 61. The tops 61 of the trays 60b, 60c, 60d, and 60e, are provided with vertical outlet tubes 68, which discharge into the next upper tray. Each of these trays is provided with a dome 69, open at its bottom and closed at its top. The outlet pipe 68 of one tray discharges into the next upper tray between the baffles and beneath the dome 69 of the next tray. Connected with each dome 69 is a gas riser or takeoff pipe 70, which pass vertically through the settling chamber 33 and discharge into the compartment 15 above the oil level C. The separated gas is thus discharged above the level C of the oil and agitation of the oil is avoided, and the separated gas or vapor while passing through the pipes 70 have their temperature reduced by heat exchange with the relatively cool oil within the chamber 33. The gases from the pipes 70 mingle with the gases in the upper end of the chamber 15 and pass through the pipe 24 and are discharged through the apertured pipe 26, below the level A of the emulsion in the chamber 14. The pipes 70 may be arranged in groups upon the opposite sides of the trays, as shown. The tray 60a is identical with the tray 60b, except that the dome 69 is omitted and the short tube 68 is omitted and a long oil riser 71 substituted for the tube 68. The oil riser 71 extends above the oil level C in the chamber 15, and the oil riser is apertured so that the oil may discharge from the riser into the body of oil in the chamber 33. The lowermost tray 60f is similar to the tray 60e and has the same horizontal top extending from one side portion of the casing 10 to the other, and is provided with one depending skirt or flange 62. The tray 60f has the same outlet tube 68 discharging into the dome 69 of the next upper tray. The tray 60f does not have the baffles 65, and this tray is extended slightly to the right, Figure 12, beyond the tray 60e. A vertical conduit 72, Figures 12 and 7, discharges into the right end of the tray 60f, Figure 12.

Arranged in the lower portion of the compartment 17 is a prewashing tray 74, Figures 1 and 9, including a top 75, extending to the left, Figure 9, to the side portion of the tank 10 and secured thereto to form a liquid tight joint and also extending to portions 74' of the side 10 and secured thereto. This top 75 has depending skirts or flanges 76, arranged at right angles to the skirts 62, and providing vertical passages 77, Figures 8 and 9. The tray 74 is open at the bottom and has baffles 78, 79, and 80, and a tubular baffle 81, arranged in staggered relation, as shown in Figure 9. The emulsion down pipe 22 passes through the top 75 behind the baffle 78, and above a horizontal baffle 81'. The liquid passing the baffle 80 discharged into the conduit 72, which leads into the tray 60f. The conduit 72 includes side walls 82 and 83. When the emulsion discharges from the down pipe 22 into the tray 74, the lighter constituents travel horizontally through the tray 74 and enter the conduit 72 and is conducted thereby to the several scrubbing and washing trays, while the heavier constituents of the emulsion may first descend below the tray 74 and subsequently pass upwardly through the tubular baffle 81 and travel through and about the heating element, to be described. When processing, the free brine or free water in the emulsion is separated out in the upper compartment 14, and automatically drained from the same. The free brine or free water, to a considerable extent, is therefore not a component of the feed stream entering the compartment 17 through the pipe 22. In the compartment 17, receiving the emulsion to be treated, the oil globules coalesce, thus separating from the brine or water included in the emulsion, and as the separation occurs, sedimentation of the brine or water takes place in the compartment 17. The heavier separated out brine or water descends into the compartment 18. When the emulsion first enters the compartment 17 beneath the tray 74, the lightest constituents travel to the passage 72, as stated. The bottom of the syphon draw-off pipe is positioned below the bottom of prewasher tray 74 so as to be immersed in the salt water stratum, thereby providing against the draw off of any constituents in the disposal salt water stream which are heavier than the lightest constituents flowing upwardly through passage 72 and which may contain oil globules and brine not yet completely separated. These constituents normally circulate upwardly through tubular opening 81 and annular opening exteriorly of the baffle, but there will be both upward and downward travel of the fluid through these openings responsive to the fluctuations of the make-up of salt water in chamber 17 and clean oil in section 33 since the combined hydrostatic head of oil and salt water in the vessel is automatically balanced by the salt water head in syphon discharge pipe 51.

We have shown a heating element in Figures 7, 10 and 11. This heating element is a more economical and effective furnace than types now in general use in similar service, since it affords a maximum heating surface in a unit volume, and the construction provides for elimination of expansion difficulties. This heating element or furnace comprises a horizontal cylindrical shell 84, positioned beneath the group of washing and scrubbing trays and above the prewashing tray 74. This shell has its inner end closed by a head 85. Extending through the shell 84 are spaced longitudinal groups of water tubes 86, which are vertical, and the upper and lower ends of these water tubes extend to the exterior of the shell 84 and are open. These vertical water tubes are provided with vertical fins 87, forming with the tubes an inner longitudinal gas passage 88 and outer gas passages 89, communicating at their forward ends. The numeral 90 designates a gas burner, having tips 91, arranged to project flames into tubes 92, discharging into the inner passage 88. A damper 93 is provided to regulate the flow of air to the burner. The gas or products of combustion travelling forwardly in the passages 89 discharge into conduits 94, which lead to a stack 95.

The operation of the apparatus, in the practice of the method, is as follows:

The incoming emulsion is fed at the proper slow rate through the heat exchanger 31 counter current to the outgoing heated oil entering the exchanger from the oil discharge pipe 37. The heat exchange between the incoming cool emulsion and the heated outgoing clean oil provides for efficient operation. This action reduces the temperature of the outgoing clean oil and effects a relative increase in temperature of the incoming oil emulsion. This action stabilizes the outgoing treated clean oil and also relieves the load, to a considerable extent, upon the heating element, due to the initial rise in temperature of the emulsion before it enters the casing 10 from the pipe 30. The temperature of the incoming oil emulsion having been raised, such heated emulsion enters the knockout chamber 14 and impinges against the vertical baffle 19. The impinging of the fluid stream upon the vertical baffle tends to separate out the free water and any free gas. The fluid stream passes downwardly within the passage 20 and discharges beneath the bottom of the baffle 19 and rises within the chamber 14. The free water tends to separate from the emulsion and accummulates in the bottom of the chamber adjacent to the head 13, while any free gas associated with the incoming fluid stream rises to the upper portion of the chamber 14, within the passage 20, and passes above the emulsion level A and comingles with any gases released from the perforated pipe 26 submerged in the emulsion below the level A. The gaseous mixture comprising the free gas from the emulsion and the gases not absorbed in the emulsion released from the perforated pipe 26 enter the mist extractor 27. The free gas is carried away through the pipe 57, while the oil condensate passes downwardly through the pipe 29 and enters the emulsion beneath the level A. As the liquid stream rises in the chamber 14 the emulsion overflows into the weir-box 21, and discharges downwardly into the pipe 22 and enters the prewasher tray 74. The chambers 15, 17, and 18 are filled with water to the level D, while the settling chamber 33 holds the clean oil having the level C. The liquid mass within these chambers is being heated by the heater element, and the inner portion of the liquid mass tends to rise, while the outer portion tends to descend and such outer portion may pass through the passages 63 and 64 and 77. When the emulsion enters the prewashing tray 74, its lighter constituents rise and travel horizontally in contact with the horizontal top 75 and about the baffles and are thereby subjected to a rubbing and scrubbing action and discharge from the tray 74 to enter the vertical conduit 72. The heavier constituents of the emulsion entering the tray 74 tend to gravitate downwardly, and upon being further heated travel upwardly through the tubular baffle 81 and pass about and through the heater element. The lighter constituents which have entered the conduit 72 now pass beneath the lowermost tray, and pass in succession from one tray to the next upper tray. When passing through these trays the lighter constituents spread out and rub against the top of the trays and the baffles, in the presence of the heat. This causes effective dehydration of the emulsion due to the prolonged travel of the emulsion through the series of washing trays. The emulsion is thus broken and the free oil is finally collected in the uppermost tray 60a and passes upwardly through the perforated pipe 71 and is discharged in the oil stratum in the chamber 33, beneath the level C. This perforated pipe minimizes any undue agitation in the settling chamber 33, since the oil is released from the pipe progressively, through the apertures, submerged in the oil stratum. The water and heavier constituents of the emulsion gravitate down through the passages 63 and 64 and 77, and settle in the lower compartment 18. When the emulsion is traveling in succession through the washing trays, any gaseous constitutents released by the heating of the emulsion or oil, while travelling through the trays, are collected in the domes 69 and discharged through the risers 70, to the top of the chamber 15.

The gases and vapors collected in the chamber 15 above the oil level C are conducted through the pipe 24 and passed through the submerged apertured pipe 26, and these gases pass into the relatively cool emulsion. This action provides for the recovery of the heavier hydrocarbon fractions in the vapor stream passing through the pipe 24, by the method of absorption and condensation, thereby removing the major portion of the hydrocarbon liquid from the vapors before the vapors pass into the chamber 14 above the level A and commingle with the free gas therein. The process of absorbing the heavier hydrocarbon fractions of the crude oil vapors in the substantially cool emulsion is supplemented to some degree by condensation, due to the cooling of the vapors in their passage through the pipe 24, which is submerged in the relatively cool incoming emulsion. In order to thoroughly strip the commingled free gases and gaseous fluids, which gaseous fluids remain after the absorption and condensation, as above described, the commingled gases and gaseous fluids are then passed through the mist extractor.

Since the washing trays having the gas vents are highly efficient, comparatively low temperatures are required for separation of the substances originally present in the raw emulsion. The relatively low temperature of the emulsion in the chamber 14, renders the absorbent action of the emulsion more effective for the oil vapors discharged therein from the pipe 26. The vaporization loss is reduced and the gravity of the treated oil is maintained at a high level. The supplemental cooling of the outgoing treated oil by the heat exchanger promotes stability of the treated oil which is delivered to the stock tank at practically the same gravity that it had in the raw emulsion. The arrangement of progressively venting the gases liberated from the washing trays, provides for the effective processing of oils, usually associated with heavy viscous oil emulsions.

Under operating conditions, a constant pressure is carried throughout the system. The system is operated at about 10 to 15 pounds pressure above atmospheric pressure and at a temperature of about 140° F., although these may be varied as may be found advantageous. The discharge of the salt water from the compartment 14 and from the compartment 18 is effected by the syphons, and the discharge of the pure treated oil from the weir-box 36 is controlled by the valve 38 and the control device 39. The gas pressure upon the upper side of the diaphragm of the valve 53 is the same as the pressure in the pipe 57, which is the same as the pressure under which the entire system operates.

It is to be understood that the forms of our invention herewith shown and described are to be taken as a preferred example of the same and that various changes in the shape, size, and arrangement of parts may be resorted to, and that changes may be made in the order of the steps of the method, without departing from the spirit of our invention or the scope of the subjoined claims.

Having thus described our invention, what we claim is:

1. The method of treating crude oil emulsion, comprising separating out gaseous vapors from the emulsion, holding a relatively cool mass of the emulsion, passing the gaseous vapors through the relatively cool mass while maintaining the same free from direct contact therewith and effecting condensation, then discharging the gases into the emulsion below the level of the emulsion for direct contact therewith and effecting maximum absorption, and collecting the condensate.

2. Apparatus for treating crude oil emulsion, comprising an upper chamber for receiving the crude oil emulsion, a gas outlet connected with the upper chamber, a water outlet connected with the upper chamber, means to supply the emulsion to the upper chamber, a lower compartment, means for withdrawing the emulsion from the upper chamber and supplying the same to the lower portion of the lower compartment, such means defining the level of the emulsion within the upper chamber so that a gas space is afforded in the upper chamber, the lower compartment holding water and the treated oil at the top of the water, a water outlet connected with the lower compartment, means for withdrawing the treated oil from the lower compartment so that a gas space is provided in the lower compartment above the treated oil, spaced superposed trays arranged within the lower compartment to contact the emulsion traveling upwardly, said trays forming with the lower compartment a circulating passage, means to heat the lower portion of the lower compartment, means to withdraw gas from beneath the individual trays and to supply the same to the gas space above the treated oil in the lower compartment, and means to conduct the gas from the gas space above the treated oil in the lower compartment into the upper chamber.

3. Apparatus for treating crude oil emulsion, comprising an upper chamber, means to supply the emulsion to the upper chamber, a gas outlet connected with the upper chamber, a water outlet connected with the upper chamber, a lower chamber, an overflow device receiving the emulsion from the upper chamber and conducting the same to the lower portion of the lower chamber, the overflow device forming a gas receiving space in the upper chamber, the lower chamber holding a column of water and treated oil, means for withdrawing the treated oil from the lower chamber and forming a gas receiving space above the treated oil, a water outlet connected with the lower chamber, a plurality of spaced superposed trays arranged within the lower chamber and forming with the lower chamber a circulating passage, means for conducting the emulsion from the lower portion of the lower chamber to the lowermost tray, pipes withdrawing gas from beneath the individual trays and discharging into the gas space in the lower chamber above the treated oil, means to heat the lower portion of the lower chamber, and means to pass the gas from the gas space of the lower chamber into the upper chamber.

4. Apparatus for treating crude oil emulsion, comprising an upper chamber, means to supply the emulsion to the upper chamber, a water outlet connected with the upper chamber, a gas outlet connected with the upper chamber, a lower chamber, an overflow device receiving the emulsion from the upper chamber and supplying the same to the lower portion of the lower chamber, the overflow device forming a gas space in the upper chamber, the lower chamber holding a column of water and treated oil, means for withdrawing the treated oil from the lower chamber and forming a gas space in the lower chamber above the treated oil, a water outlet connected with the lower chamber, a plurality of spaced superposed trays arranged within the lower chamber and forming with the lower chamber a circulating passage, each tray having a lower recess and baffles within such recess, each tray excepting the uppermost tray having a discharge tube leading into its lower recess and the next lower recess of the upper tray, gas takeoff pipe leading into the lower recess of each tray excepting the uppermost tray and discharging into the gas space of the lower chamber, a perforated pipe leading into the lower recess of the uppermost tray and passing into the treated oil in the lower chamber, means to heat the lower portion of the lower chamber, means to pass the gases from the gas space of the lower chamber into the upper chamber, means for conducting the emulsion from the lower portion of the lower chamber to the lowermost tray, and a water outlet connected with the lower chamber.

5. Apparatus for treating crude oil emulsion, comprising an upper chamber, a gas outlet for the upper chamber, a water outlet for the upper chamber, means to supply the emulsion to the upper chamber, a lower chamber, an overflow device receiving the emulsion from the upper chamber and supplying the same to the lower portion of the lower chamber, the overflow device forming a gas space in the upper chamber, the lower chamber holding a column of water and treated oil, means for withdrawing the treated oil from the lower chamber and forming a gas space in the lower chamber above the treated oil, a water outlet connected with the lower chamber, a plurality of spaced superposed trays arranged within the lower chamber and forming with the chamber a circulating passage, each tray having a lower recess and baffles within such recess, each tray excepting the uppermost tray having a dome leading into its lower recess, gas takeoff pipes connected with the domes and discharging into the gas space of the lower chamber, a discharge tube leading into the lower recess of each tray excepting the uppermost tray and discharging into the lower recess of the next upper tray, a perforated pipe leading into the lower recess of the uppermost tray and passing into the treated oil in the lower chamber, a tray arranged in the lower portion of the lower chamber and receiving the emulsion from the overflow device, the last named tray having a lower recess and baffles in such recess, means to conduct the emulsion from the lower recess of the last named tray to the lower recess of the lowermost tray of the first named trays, a heating element extending between the group of upper trays and the lowermost tray.

6. Apparatus for treating crude oil emulsion, comprising an upper chamber, means to supply the emulsion to the upper chamber, a gas outlet connected with the upper chamber, a water outlet connected with the upper chamber, a lower chamber, an overflow device receiving the emulsion from the upper chamber and extending into the lower portion of the lower chamber, the lower chamber holding a column of water and treated oil, means for withdrawing the treated oil from the lower chamber and forming a gas space in the lower chamber, a water outlet connected with the lower chamber, a plurality of spaced superposed trays arranged within the lower chamber and forming with the lower chamber a circulating passage, a tray arranged within the lower portion of the lower chamber and receiving the emulsion from the overflow device, the last named tray having a lower recess and baffles and a tubular baffle within the lower recess, a heating element arranged between the group of trays and the last named tray, and means to conduct the emulsion from the lower recess of the last named tray to the lowermost tray in said group of trays.

7. Apparatus for treating crude oil emulsion, comprising an upper chamber, an overflow device for defining the level of the emulsion in the upper chamber, means to supply the emulsion to the upper chamber, a gas outlet connected with the upper chamber, and a water outlet connected with the upper chamber, a lower chamber, holding a column of water and treated oil, outlet means connected with the lower chamber for the treated oil to define a gas space in the lower chamber above the treated oil, a water outlet connected with the lower chamber, a pipe leading into the gas space of the lower chamber and extending through the emulsion in the upper chamber for heat exchange therewith, a generally horizontal perforated pipe arranged beneath the level of the emulsion in the upper chamber and connected with the first named pipe, emulsion scrubbing means arranged within the lower chamber, means to heat the lower chamber, and means receiving the emulsion from the overflow device and conducting the same into proximity to the emulsion scrubbing means.

8. Apparatus for treating crude oil emulsion, comprising an upper chamber, a gas outlet for the upper chamber, a water outlet for the upper chamber, a lower chamber for holding a column of water and heated oil and having a gas space at its top, a water outlet connected with the lower chamber, a generally vertical baffle arranged within the upper chamber, means to introduce the emulsion into the upper chamber and to cause the same to impinge upon the baffle, means for withdrawing the emulsion from the upper chamber and defining the level of the emulsion and providing a gas space in the upper chamber, means for withdrawing the treated oil from the lower chamber, the baffle extending below the level of the emulsion, a second generally vertical baffle arranged within the upper chamber and extending beneath the level of the emulsion and forming a contracted passage, a pipe leading into the gas space of the lower chamber and passing through the emulsion in the upper chamber and having a U-shaped portion which straddles the top of the second baffle and extends below the level of the emulsion in the contracted passage, a generally horizontal perforated pipe secured to the lower end of the U-shaped portion and arranged beneath the level of the emulsion, and apparatus arranged within the lower chamber and receiving the emulsion from the emulsion withdrawing means and acting upon the same to break the emulsion and separate out the gases, the gases passing to the gas space of the lower chamber.

9. Apparatus for treating crude oil emulsion, comprising an upper chamber, a gas outlet connected with the upper chamber, a water outlet connected with the upper chamber, means to withdraw the emulsion from the upper chamber and define the level of the same, a generally vertical baffle arranged within the upper chamber remote from and opposite the withdrawing means and extending below the level of the emulsion, means to supply the emulsion to the upper chamber and cause the same to strike against the baffle, a second generally vertical baffle arranged within the upper chamber between the withdrawing means and the first named baffle and extending below the level of the emulsion and forming with the withdrawing means a narrow passage, a lower chamber for holding a column of water and treated oil and having a gas space, a water outlet connected with the lower chamber, means connected with the lower chamber to withdraw the treated oil, a pipe leading into the gas space of the lower chamber and extending into the upper chamber and having its outlet end discharging beneath the level of the emulsion within the narrow passage, and apparatus arranged within the lower chamber and receiving the emulsion from the withdrawing means and acting upon the same to break the emulsion and separate out the associated gas.

10. Apparatus for treating crude oil emulsion, comprising an upper chamber, means to introduce the emulsion into the upper chamber, a water outlet for the upper chamber, an overflow device for the upper chamber to define the level of the emulsion and providing a gas space in the upper chamber, a generally vertical baffle arranged within the upper chamber and extending beneath the level of the emulsion and spaced from the overflow device to form a reduced passage, a mist extractor arranged within the gas space of the upper chamber, a condensate pipe leading from the mist extractor and having its lower end submerged in the emulsion, a gas outlet pipe communicating with the mist extractor, a lower chamber holding a column of water and treated oil and having a gas space, a water outlet connected with the lower chamber, means connected with the lower chamber to withdraw the treated oil, a pipe leading into the gas space of the lower chamber and discharging into the passage at an elevation below the level of the emulsion, and apparatus arranged within the lower chamber to receive the emulsion from the overflow device and to act upon the same to break the emulsion and free the associated gas.

11. Apparatus for treating crude oil emulsion, comprising a chamber for holding a column of water and treated oil, a plurality of spaced superposed trays arranged within the chamber, each tray having a lower recess closed at its top and side and open at its bottom and baffles arranged within said lower recess, each tray excepting the uppermost tray having liquid outlet means which leads into the lower recess of such tray and discharges into the lower recess of the next upper tray, an upstanding gas takeoff pipe leading into the lower recess of each tray excepting the uppermost tray and having its upper end discharging into the chamber above the column of water and treated oil, means to supply the emulsion into the chamber beneath the trays, liquid and gas outlet means connected with the uppermost tray and leading to the lower recess of the uppermost tray, means to heat the column of water and oil within the chamber, means to withdraw water from the chamber, and means to withdraw treated oil from the chamber.

12. Apparatus for treating crude oil emulsion, comprising a chamber for holding a column of water and treated oil, a plurality of spaced superposed trays arranged within the chamber, each tray having a lower recess closed at its top and side and open at its bottom, each tray excepting the uppermost tray having liquid outlet means which leads into the lower recess of such tray and discharges into the lower recess of the next upper tray, a gas takeoff pipe leading into the lower recess of each tray excepting the uppermost tray and having its upper end discharging into the chamber above the column of water and treated oil, a separate tray arranged within the chamber beneath the group of spaced trays, said separate tray having a lower recess closed at its top and side and open at its bottom and baffles and a tubular baffle open at its top and bottom arranged within the lower recess of the separate tray, liquid and gas outlet means connected with the uppermost tray in the group and leading to the lower recess of such uppermost tray, means for supplying an emulsion to the separate tray, means forming a passage and receiving the emulsion from the separate tray and discharging the same into the lower recess of the lowermost tray in the group, a heating element arranged between the separate tray and the group of trays, a water outlet connected with the chamber, and oil withdrawing means connected with the chamber.

13. In apparatus for treating crude oil, as a sub-combination, a tray having a lower recess closed at its top and side and open at its bottom, baffle means arranged within the lower recess, an outlet tube mounted upon the tray and leading into the lower recess and extending above the tray for discharging into the lower recess of a next companion tray, and a gas takeoff pipe connected with the tray and communicating with the lower recess and being sufficiently long to extend above the top of the liquid column in which the tray is submerged.

ARTHUR V. B. CANDLER.
WILLIAM A. STOVER.

REFERENCES CITED

The following references are of record in the file of this patent:

UNITED STATES PATENTS

| Number | Name | Date |
| --- | --- | --- |
| 1,775,362 | Demarcus | Sept. 9, 1930 |
| 2,083,861 | Padgett | June 15, 1937 |
| 2,167,160 | Raymond | July 25, 1939 |
| 2,256,695 | Walker | Sept. 23, 1941 |
| 2,257,244 | Oehler | Sept. 30, 1941 |
| 2,296,992 | Gary | Sept. 29, 1942 |
| 2,297,297 | Walker | Sept. 29, 1942 |
| 2,354,856 | Erwin | Aug. 1, 1944 |
| 2,355,076 | Johnson | Aug. 8, 1944 |